(No Model.) 3 Sheets—Sheet 1.

F. H. BASSETT.
CURTAIN FIXTURE.

No. 575,411. Patented Jan. 19, 1897.

WITNESSES

INVENTOR
Fred H. Bassett
By Geo. D. Phillips
his Atty.

(No Model.) 3 Sheets—Sheet 2.

F. H. BASSETT.
CURTAIN FIXTURE.

No. 575,411. Patented Jan. 19, 1897.

WITNESSES
H. A. Lauly
F. B. Shuster

INVENTOR
Fred H. Bassett.
By Geo. D. Phillips
His Atty.

(No Model.) 3 Sheets—Sheet 3.

F. H. BASSETT.
CURTAIN FIXTURE.

No. 575,411. Patented Jan. 19, 1897.

WITNESSES
H. A. Lamb
F. B. Shuster

INVENTOR
Fred H. Bassett
By Geo. Phillips.
His Atty.

UNITED STATES PATENT OFFICE.

FRED H. BASSETT, OF SARANAC LAKE, NEW YORK.

CURTAIN-FIXTURE.

SPECIFICATION forming part of Letters Patent No. 575,411, dated January 19, 1897.

Application filed June 15, 1896. Serial No. 595,530. (No model.)

*To all whom it may concern:*

Be it known that I, FRED H. BASSETT, a citizen of the United States, and a resident of Saranac Lake, in the county of Franklin and State of New York, have invented certain new and useful Improvements in Curtain-Fixtures, of which the following is a specification.

My invention relates to curtain-fixtures, and is an improvement on my application filed October 28, 1895, Serial No. 567,053; and it consists in certain features of improvement to be more fully set forth in the following specification.

To enable others to fully understand my invention, reference is had to the accompanying drawings, in which—

Figure 1:
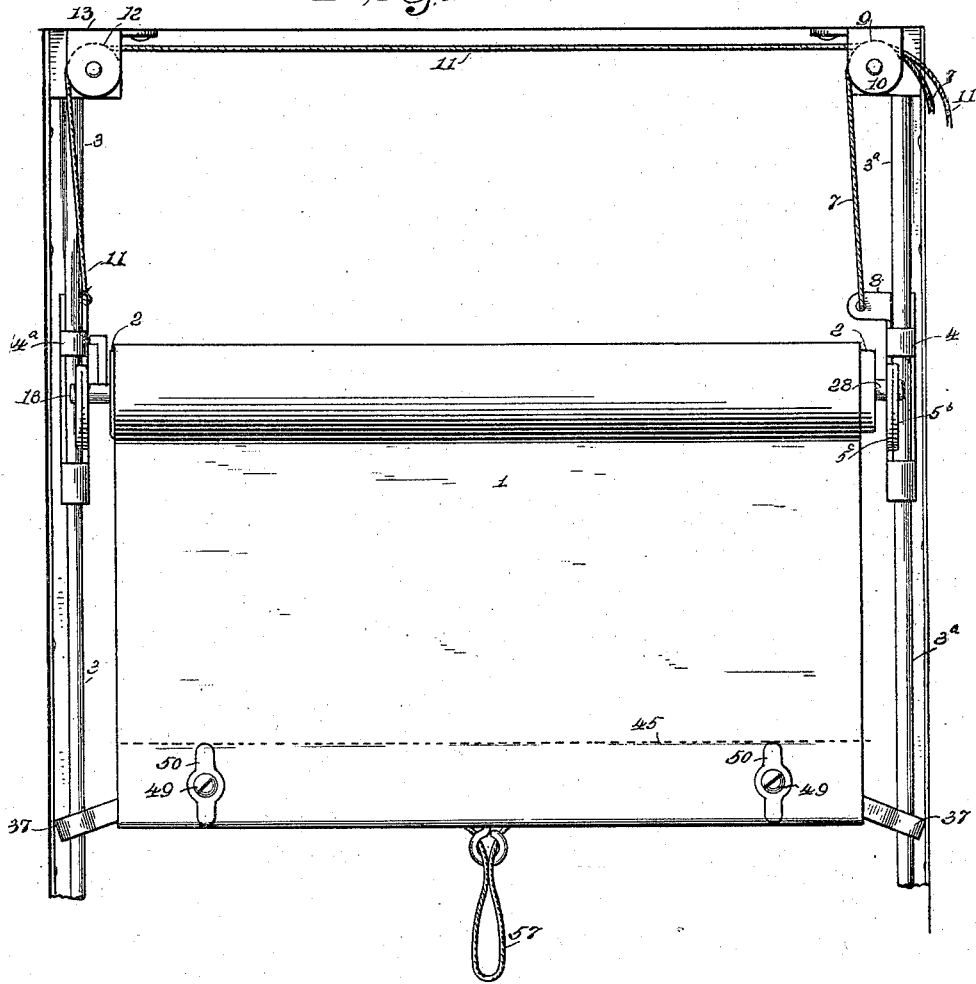
Figure 2:
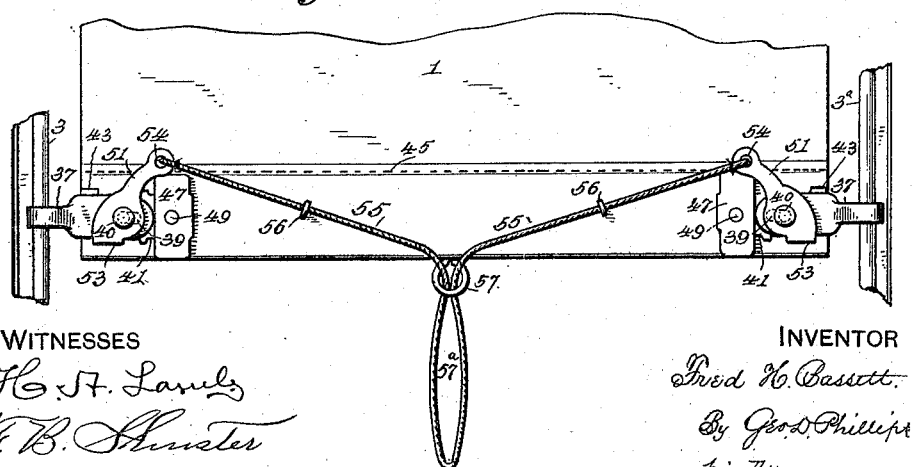
Figure 3:
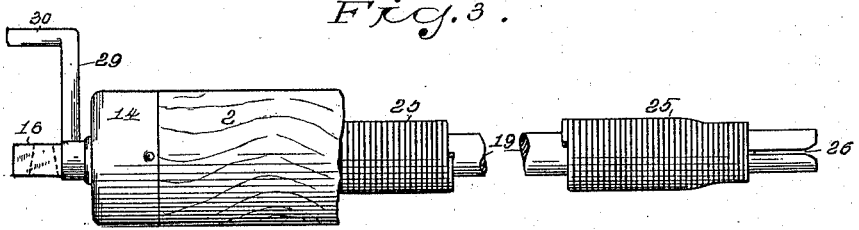
Figure 4:
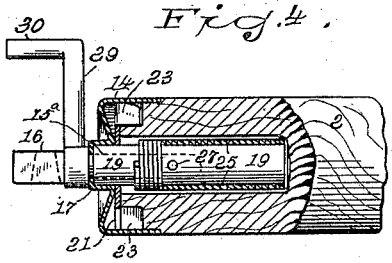
Figure 5:
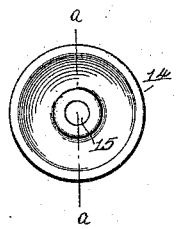
Figure 6:
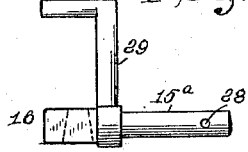
Figure 7:
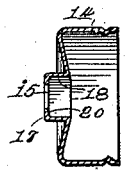
Figure 8:
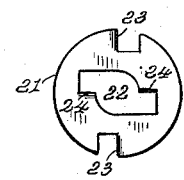
Figure 9:
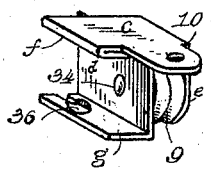
Figure 10:
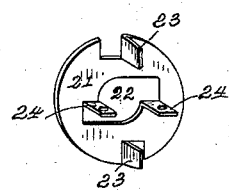
Figure 11:
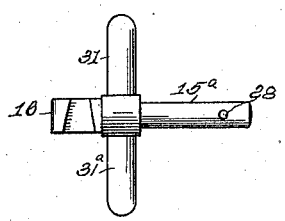
Figure 12:
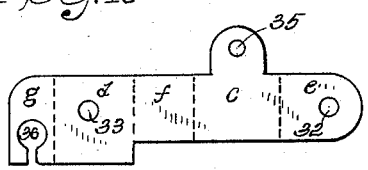
Figure 13:
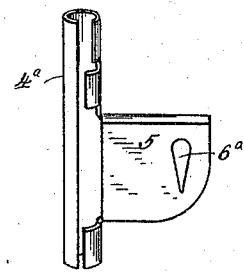
Figure 14:
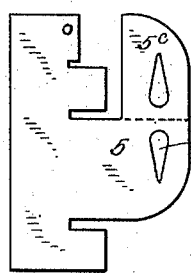
Figure 15:
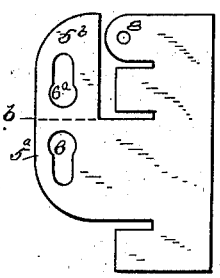
Figure 16:
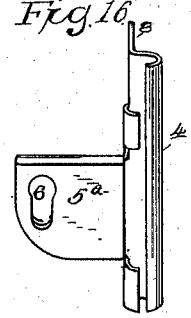
Figure 17:
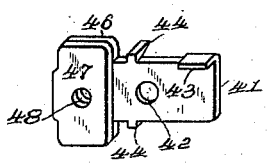
Figure 18:
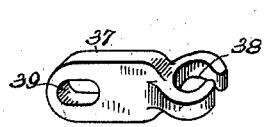
Figure 19:
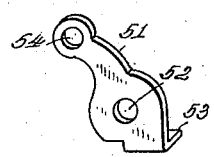
Figure 20:
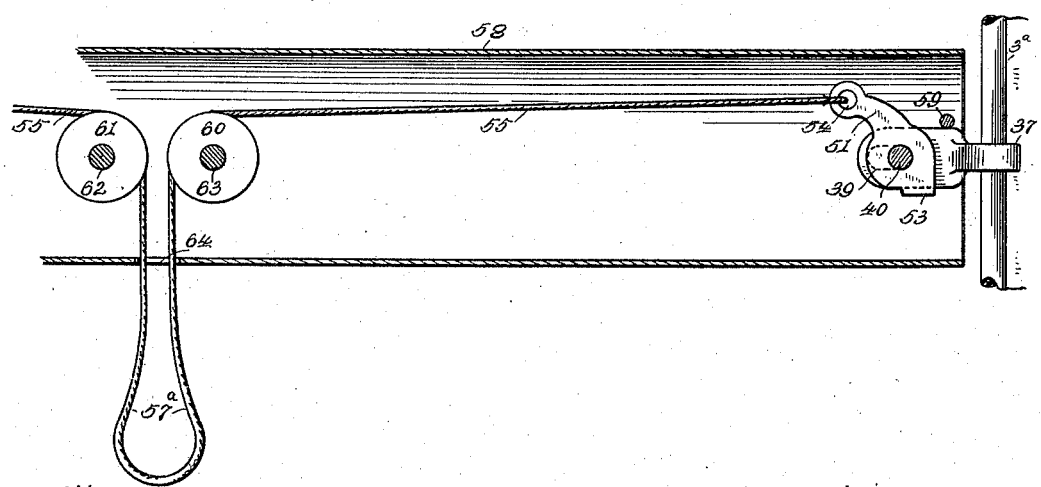

Figure 1 represents a front broken elevation of a window-frame, showing the curtain partially rolled up and the curtain-roll dropped a short distance from the top, also the clutches attached to the lower curtain-slat and gripping the side guide-rods. Fig. 2 is a rear elevation and broken view of the lower portion of the curtain and side guide-rods with the clutches raised to a horizontal position and released, so that the spring in the curtain-roller will draw the curtain up. Fig. 3 is a detail broken side elevation of the curtain-roller and broken view of the spring-rod and spring, showing also the winding-arm rigidly attached thereto. Fig. 4 is a detail broken sectional view of the curtain-roller, spring-rod, and spring, and a sectional view of the retaining-cap on the end of the roller. Fig. 5 is a detail end elevation of the roller-retaining cap. Fig. 6 is a detail side elevation of the spring-winding arm, having a shank portion adapted to be inserted into the end of the roller-spring rod and an outer projecting end which serves as an end support for the curtain-roll. Fig. 7 is a detail central sectional view of the roller-retaining cap through line $a$ of Fig. 5. Fig. 8 is a detail front elevation of the metal plate to which one end of the roller-tension spring is secured and which plate is also anchored in the end of the wooden roller. Fig. 9 is a detail perspective view of one of the cord-pulley brackets. Fig. 10 is a detail perspective view of the reverse side of the spring-plate shown at Fig. 8. Fig. 11 is a detail modification of the spring-winding arms. Fig. 12 is a detail view of the blank which forms the pulley-brackets. Fig. 13 is a detail view of one of the curtain-roller bracket-sleeves, which is intended to embrace and operate on the guide-rod at the left of the window-casing. Fig. 14 is a detail view of the blank from which the bracket-sleeve shown at Fig. 13 is formed. Fig. 15 is a detail view of the blank from which the right-hand curtain-roller bracket-sleeve is formed. Fig. 16 is a detail view of the right-hand curtain-roller bracket-sleeve. Fig. 17 is a detail view of the clutch-trip plate. Fig. 18 is a detail view of one of the clutches that engages with the side guide-rods. Fig. 19 is a detail view of one of the clutch-trips. Fig. 20 is a broken sectional view of a tubular curtain-rod with the improved clutch mechanism located within said tubular rod, and the operating-cords for such mechanism.

Its construction and operation are as follows:

1, Figs. 1 and 2, is the curtain or shade; 2, the curtain-roll; 3 $3^a$, side guide-rods on which are adjustably mounted the curtain-roller bracket-sleeves 4 $4^a$. These bracket-sleeves are, as before mentioned, made of a single metal blank, Fig. 14 being the blank from which the sleeve $4^a$ is formed, while Fig. 15 represents the blank from which the sleeve 4 is formed. The bracket portions 5 $5^a$ of the sleeves are reinforced by the part $5^b$ and $5^c$, and the elongated openings 6 and $6^a$ are also provided therein to admit the end bearings of the curtain-roll presently to be described. A counterpart of the openings is also provided, as shown, in these reinforced parts, so that when folded over on the main bracket, as indicated by dotted lines $b$, there will be a double thickness of metal to support the end bearings of the curtain-roller. The main portions of the blanks are of tubular form to embrace the side guide-rods before mentioned.

Referring again to Fig. 1, 7 represents a lifting-cord attached to the projection 8 of the sleeve 4, thence passing over the double pulley 9 in the bracket 10 at the upper right-hand corner of the casing. 11 is a cord running over such double pulley and along the window-casing and over the single pulley 12 of the bracket 13 and having its end attached to the sleeve $4^a$. These cords are extended down the right-hand side of the casing and, if desired, may be united in one single cord outside of the double pulley 10 and at a distance therefrom sufficient to prevent such single cord being brought in contact with said pulley.

Referring to Figs. 3, 4, 5, and 7, the wooden roller 2 has mounted on its outer end the metal retaining-cap 14, which cap has the central hole 15 to admit the shank $15^a$ of the end or roller support 16, (see also Fig. 6,) thus forming both a bearing and journal. In drawing this cap the projection 17 is formed to furnish the bearing 18, in which the end of the spring-rod 19 is journaled. The end wall 20 of such cap also supports the end of such rod.

21 is a sheet-metal plate attached to the end of the curtain-roller, and is provided with the central opening 22 to admit the spring-rod 19. The lugs 23, Fig. 10, are broken out of the body of the stock and turned rearward to enter the end of the wooden curtain-roller and will prevent such plate turning. The central lugs 24 have holes therethrough, to which the free end of the spring 25 is anchored, while the other end of said spring is anchored in the slot 26 of the rod 19, as shown at Fig. 3.

The shank $15^a$ of the roller-support (see Figs. 4 and 6) passes through the central hole 15, before mentioned, and enters a hole provided therefor in the end of the spring-rod 19, and is rigidly secured therein by the transverse pin 27, passing through the hole 28 of such shank. This construction secures the roller support or end 16 firmly to the spring-rod, while the roller may be freely rotated thereon when such support and also the support 28 of such roller are placed in their respective brackets 5 and $5^a$.

As my various improvements are especially designed for use in connection with a pawlless spring-roller, I have provided means whereby the spring in such roller can be easily and readily wound and held under control until after the roller is placed in its supporting-brackets. For this purpose the arm 29, having the handle portion 30, is rigidly connected to the spring-rod 19 of the curtain-roller 2, so that the operator will have a good purchase by which to store up sufficient tension in the spring to operate the curtain. This winding feature is not only useful as a means to expedite the fitting up of a house with a complete set of curtain-fixtures, but it furnishes ready means whereby the curtain can be temporarily removed from its support and the lost tension of the spring restored in a few moments without the aid of a special wrench for that purpose, as a wrench is not always readily accessible. It is also equally well adapted to rollers having pawls.

Instead of the single arm, as above described, with a handle portion projecting therefrom the modification shown at Fig. 11 would answer the same purpose. In this construction there are the two straight arms 31 and $31^a$.

The pulley-brackets 10 and 13, Fig. 1, are preferably constructed of a single sheet-metal blank, as shown at Fig. 12, the only difference existing between them being in the manner of folding or bending the blanks to accommodate either a single or double pulley, or with respect to the position they are to occupy at different corners of the ceiling of the window-casing. The said blank has the holes 32 and 33 for the pin 34, Fig. 9, on which pulley 9 is journaled, also the hole 35 for the retaining-screw to secure said bracket to the casing.

36 is an opening adapted to receive the side guide-rod. This blank is bent or folded at the points indicated by the transverse dotted lines, Fig. 12, so that the part $c$ will form the supporting-floor and the parts $d$ and $e$ the vertical walls, between which walls is journaled the pulley 9. (See Fig. 9.) The part $f$ will form the overhang to correspond with the foot $g$. The other bracket, as before mentioned, is made from the same blank and folded in the same manner, except that the distance between the vertical walls $d$ $e$ is narrower to accommodate the single pulley used at the left of the casing and also to accommodate the changed position from right to left.

The mechanical arrangement necessary to control and operate the lower slat of the curtain is fully illustrated at Figs. 1, 2, 17, 18, and 19. The construction of the several parts are similar on each side of the window. Therefore a brief description of one will suffice for the other, and the same figures of reference will answer for both.

37 are the clutches, having (see Fig. 18) an opening 38 to embrace and engage with the guide-rods 3 and $3^a$.

39 is an elongated hole in the body of the clutch, and 40 is a pin upon which such clutch is mounted on the base-plate 41. The elongated hole is provided in the clutches to accommodate for window-casings that are not quite parallel with each other. The plate 41 (see Fig. 17) has the hole 42, to which such pin 40 is anchored.

43 is an overhanging stop to limit the upward movement of the clutch to a horizontal position.

44 are metal points that enter the wooden slat 45 to prevent the base-plate moving. As this base-plate 41 is made of sheet-metal, it is necessary to reinforce such parts as are provided with threaded holes. Therefore the wings 46 of such plate have the counterpart 47, which is folded over upon such base and the threaded hole 48 provided therein to receive the threaded end of the screws 49 by which such base-plates are secured to the lower slat 45 of the curtain. Additional plates 50 are also placed under the heads of such screws to prevent their sinking into the wood.

51, Fig. 19, represents one of the two trips that engage with the clutches and has the hole 52, by which it is journaled to one of the pins 40. The said trip has the laterally-projecting toe 53, which projects underneath the lower edge of the clutch and forward of its fulcrum-point, so as to lift such clutch to a horizontal position. Holes 54 are provided in the upper end (see also Fig. 2) for the operating-cord 55, and the free ends of this cord are secured to the two trips. Staples 56 are preferably provided in the lower slat to prevent said cords dropping below such slat, while the central portion of such cord is looped and passed through the central eye-bolt 57 in the bottom of the slat.

The operation of the curtain as above described is as follows: The free ends of the upper cords 7 and 11 are properly secured to the side of the casing, and the curtain-roller is, by its connection with the slides 4 and 4$^a$ and by means of such cords, raised and lowered on the side guide-rods. In Fig. 1 the clutches 37 are in their normal position, firmly gripping the side guide-rods. Pulling down on the central loop 57$^a$, Fig. 2, will raise the trips 51, whose projections or toes 53 will disengage the clutches from their contact with the guide-rods by bringing such clutches in a horizontal position against the projections 43. This will also bring the openings in such clutches parallel with such guide-rods, so that the stored-up tension of the roller-spring will elevate the curtain-slat, and the instant the clutches are released they will fall of their own gravity and reëngage the guide-rods, as shown at Fig. 1.

The advantage of the stops for limiting the upward movement of the clutches is apparent from the fact that no matter what force is applied to the operating-cords the clutches, either when the curtain is being raised or lowered, will always be brought into a horizontal position, so that the movement of the curtain will not be impeded.

In using the tubular rod or slat 58, Fig. 20, the construction is placed within such tube and the pin 59 is used for a stop to limit the upward movement of the clutches, which pin extends through such tube; so, also, would the pins on which the clutches and their trips are fulcrumed. Rolls 60 and 61 would need to be mounted on the pins 62 and 63, over which pins the operating-cord would need to pass, so as to bring the handle portion or loop of the cord through the central slot 64 of such tube.

Having thus described my invention, what I claim as new, and desire to secure by Letters Patent, is—

1. In a curtain-fixture, of the character described, having cord-roller brackets located at each upper corner of the casing, said brackets made from the same sheet-metal blank and bent in the forms as shown, viz: the part $c$ folded upon the part $g$ to form the supporting-floor, the parts $e$ and $d$ bent at right angles thereto to form the vertical supporting-walls for the pulleys, the part $g$ having the hole 36 to embrace the side guide-rod, and bent at right angles to the said vertical walls and equal to the overhang of the part $f$ substantially as set forth.

2. The combination, in a curtain-fixture, having a pawlless spring-roller and side guide-rods, of clutches connected to the lower curtain-slat and adapted to engage with such rods, said clutches pivotally supported on such slat and adapted to have both a longitudinal and a radial movement on their supports to accommodate for different widths of casings, and to engage the guide-rods, trips, and means whereby such trips are caused to engage such clutches to release their grip on the guide-rods so as to bring the lower part of the curtain under the control of the roller-spring, a stop to limit the upward movement of such clutches so that the openings therein will slide freely over such rods, and when said trips are released, they will, together with the clutches, fall of their own gravity and such clutches reëngage with the guide-rods, as described and set forth.

3. The combination, in a curtain-fixture, having a pawlless spring-roller and side guide-rods of clutches on the lower curtain-slat adapted to engage such rods in the manner substantially as shown, a base-piece on which such clutches are pivotally supported and adapted to have both a horizontal and a radial movement thereon, for the purpose described, trips and means for operating them, said trips mounted on the pivotal support of said clutches, means on said trips for engaging said clutches whereby said clutches are disengaged from the guide-rods, stops on the base-pieces for limiting the upward movement of such clutches so as to permit of their free movement over the guide-rods, as set forth.

4. The combination, in a curtain-fixture, having a pawlless spring-roller and side guide-rods, of clutches to engage such rods, said clutches pivotally supported on the curtain-slat, and having a longitudinal and a radial movement on such supports, for the purpose described, trips also mounted on the pivotal supports of such clutches, an operating-cord attached to said trips, said cord brought to the central portion of the curtain-slat and depending therefrom, for the purpose, as set forth.

5. The combination, in a curtain-roller, of the character described, with the curtain-roller and an internal spring-rod carrying a tension-spring, of an end plate made of a single piece of metal anchored in the end of said roller, means on said plate to secure the free end of the tension-spring, a cup-shaped cap embracing the end of said roller and spring-plate, a central bearing therein for the spring-rod, and also to receive the end thrust thereof, an end bearing-support for the curtain-roller, a latterly-projecting winding-arm on such end support whereby the said tension-spring is wound, a supporting-bearing in said cup-shaped cap for the shank of the said end support, as described and for the purpose set forth.

Signed at Bridgeport, in the county of Fairfield and State of Connecticut, this 28th day of May, A. D. 1896.

FRED H. BASSETT.

Witnesses:
WM. E. DISBROW,
LEWIS F. PELTON.